United States Patent Office 2,992,227
Patented July 11, 1961

2,992,227
5-CHLORO-2-(2-CYCLOHEXENYLTHIO)
BENZOTHIAZOLE
John J. D'Amico, Charleston, W. Va., assignor to Monsanto Chemical Company, St. Louis, Mo., a corporation of Delaware
No Drawing. Filed Nov. 19, 1959, Ser. No. 854,018
1 Claim. (Cl. 260—306)

This invention relates to 5-chloro-2-(2-cyclohexenylthio)benzothiazole which may be prepared as follows: To a stirred solution comprising 50.4 grams (0.25 mole) of 5-chloro-2-mercaptobenzothiazole, 40 grams (0.25 mole) of 25% sodium hydroxide and 250 ml. of water was added in one portion 40.3 grams (0.25 mole) of 3-bromocyclohexene. An exothermic reaction set in causing the temperature to rise from 25 to 48° C. After stirring at room temperature for 24 hours, 200 ml. of water and 300 ml. of ether were added. The ether solution was separated, washed with water until neutral to litmus and dried over sodium sulfate. The ether was removed in vacuo at a maximum temperature of 80–90° C. The product was obtained as an amber oil in 81% yield. Analysis gave 4.7% nitrogen and 22.2% sulfur as compared to 5.0% nitrogen and 22.8% sulfur calculated for $C_{13}H_{12}ClNS_2$.

The product is both a contact herbicide and defoliant. These useful properties were demonstrated by applying 5-chloro-2-(2-cyclohexenylthio)benzothiazole in spray form to the foliage of grasses, to the foliage of bean plants and to the foliage of a mixture of broadleaved plants and observing the phytotoxicity. In the table below, 0 indicates no phytotoxicity, 2 moderate phytotoxicity, 3 severe phytotoxicity and B indicates defoliation. A concentration of 0.5% of the active ingredient was employed.

Table

|  | Grass Mixture | Bean | Broadleaf Mixture |
|---|---|---|---|
| 5-Chloro-2-(2-cyclohexenylthio)-benzothiazole | 2 | 3+B | +<br>3₀ |
| 2-(2-Cyclohexenylthio)benzothiazole | 0 | 0 |  |

B=95% defoliation.

It will be noted that 2-(2-cyclohexenylthio)benzothiazole exerted neither herbicidal nor defoliant action.

It is intended to cover all changes and modifications of the examples of the invention herein chosen for purposes of disclosure which do not constitute departures from the spirit and scope of the invention.

What is claimed is:
5-chloro-2-(2-cyclohexenylthio)benzothiazole.

References Cited in the file of this patent
FOREIGN PATENTS
767,806   Great Britain _____ Feb. 6, 1957

OTHER REFERENCES
Moore; Chem. Abstracts, vol. 47, col. 10523 (1953).